United States Patent
Iwaoka et al.

[15] 3,705,643
[45] Dec. 12, 1972

[54] BRAKE & CLUTCH CONTROL FOR INDUSTRIAL TRACK

[72] Inventors: Seijiro Iwaoka; Hiroo Mori, both of Kariya, Japan

[73] Assignee: Kabushiki Kaisha Toyoda Jidoshokki Seisakusho, Aichi-ken, Japan

[22] Filed: June 25, 1970

[21] Appl. No.: 49,819

[30] Foreign Application Priority Data

June 27, 1969 Japan ....................44/51131
June 30, 1969 Japan ....................44/52057
Sept. 10, 1969 Japan ....................44/72203

[52] U.S. Cl................192/13 A, 188/352, 192/4 A
[51] Int. Cl..............................................F16d 67/02
[58] Field of Search.....192/13 A, 4 A, 4 C; 188/352, 188/264 F

[56] References Cited

UNITED STATES PATENTS 3,298,471  1/1967  Evans.....................192/3 R
3,181,667  5/1965  Lohbauer et al..........192/4 A

*Primary Examiner*—William F. O'Dea
*Assistant Examiner*—Randall Heald
*Attorney*—Robert E. Burns and Emmanuel J. Lobato

[57] ABSTRACT

The fluid control system applied to the industrial trucks, is provided with a check valve in a fluid line between a master cylinder and a plurality of wheel cylinders so as to interrupt the return flow of brake oil from the wheel cylinders to the master cylinder, and an interfering means in a bypass line to the check valve so as to admit the return flow of the brake oil in a controlled or restricted condition when the oil pressure in the hydraulic clutches reach to a sufficient pressure for engaging the clutches.

9 Claims, 5 Drawing Figures

BRAKE & CLUTCH CONTROL FOR INDUSTRIAL TRACK

BRIEF SUMMARY OF THE INVENTION

The present invention relates to an improved fluid power control system for operating the industrial truck such as a fork lift truck and shovel loader.

Generally, it is well-known that the fluid actuated forward and reverse clutches are utilized for operating trucks easily in connection with engine driven torque convertor. For example, as disclosed in U. S. Pat. No. 2,786,368, in the industrial trucks such as fork lift truck and shovel loader, since it is required to release the clutches so as to stop driving of the truck when the engine is driven at high speed for operating the fork lift or shovel loader and further it is desirable to commence the above-mentioned operation just after stopping the truck by applying the releasing motion of the clutches in accordance with the depression of the brake pedal, it is conventional that a cut-off valve is hydraulically connected with a brake pedal by way of a fluid line and also is communicated with the hydraulic clutch means so that the clutch means can be released by depressing the brake pedal.

However, in the above-mentioned control system, following two drawbacks have been experienced; that is, at the time of releasing the brake pedal for commencing the driving of the truck, wheel cylinder assemblies hydraulically connected with the brake pedal are released in accordance with the initial return motion of the brake pedal so that the braking force becomes nil and then the hydraulic clutches are engaged by leading compressed oil thereinto in accordance with the motion of the cut-off valve when the brake pedal is further returned to its original free position. Consequently, it is inevitable to avoid the creation of a time lag 0.5 to 1 second between the time when the braking force becomes nil and the time when the hydraulic clutches are engaged, so that the truck moves 0.5 to 1 meter rearwardly by the weight thereof when the truck is commenced its hill climbing.

On the other hand, in case of using the above-mentioned industrial truck on level land, the truck moves instantly when the hydraulic clutches are engaged so that strong shock is imparted to the operator and leading substances. Therefore, the operation of the industrial truck in the above-mentioned conditions is always carried out in dangerous conditions. To absorb the shock created at the time of driving, a certain damper for absorbing the shock energy was tried by arrangement in a fluid circuit communicated with the hydraulic clutches. However, the above-mentioned time lag is enlarged so that the distance of rearward movement of the truck becomes large when the brake pedal is released in a condition of hill climbing.

To eliminate the above-mentioned drawbacks, U. S. Pat. No. 2,972,906 teaches utilization of a clutch treadle which moves a spool valve through a suitable linkage to vary pressure on one hydraulic clutch and a brake treadle which is connected through a linkage to a brake master cylinder. In the inching control device, according to the above-mentioned U. S. Pat. No. 2,972,906, when the engine is driven at a high speed while stopping the truck so as to operate a cylinder for load handling operation, the hydraulic clutches to drive the truck in a forward direction or in a reverse direction must be controlled in their released condition, therefore, the above-mentioned clutch pedal is depressed. On the other hand, when it is required to start hill climbing, the above-mentioned brake pedal is depressed and then an accelator pedal is depressed while the depression of the brake pedal is releasing so that the rearward movement of the truck can be prevented. However, it is practically difficult to operate two kinds of brake pedals, that is, the clutch treadle and the brake pedal, because, the operator of the truck has to operate the accelator pedal, a change lever, a steering handle and a lever for controlling motion of a valve which actuates the load handling operation, beside the above-mentioned operation of brake pedals.

The principal object of the present invention is to eliminate the above-mentioned drawbacks of the conventional industrial trucks, in other words, to provide a fluid control system which permits easy operation of the truck. Further, smooth starting with weak shock and safely starting the truck without moving rearward when the operator wants to start its hill climbing.

Generally, in the fluid control system of the present invention, a check valve is arranged in a fluid line from a master cylinder for braking operation to a plurality of wheel cylinders so that the return flow of the brake oil from the wheel cylinders to the master cylinder is interrupted, and a control valve is arranged in a bypass line, so as to attain the following function. That is, when the pressure of oil led to hydraulic clutches elevates to a sufficient pressure for engaging the clutches, the control valve admits to communicate the bypass line so that the brake oil can flow back from the wheel cylinders to the master cylinder. Consequently, since the clutches are engaged and the driving force of the engine is transmitting to driving wheels before the clutches are engaged, the truck is commenced to move in accordance with releasing of the braking force and it can be prevented to move the truck backward by its own weight at the start of hill climbing. Further, since the control valve, which is arranged in the bypass line so as to release the braking force, has a function of a throttle to restrict the back flow of the brake oil from the wheel cylinders to the master cylinder, the oil pressure in the wheel cylinders decreases gradually even though the depression of the brake pedal is released instantly, so that it can be prevented from starting the vehicle, instantly.

DETAILED DESCRIPTION OF THE INVENTION

Figure 1:
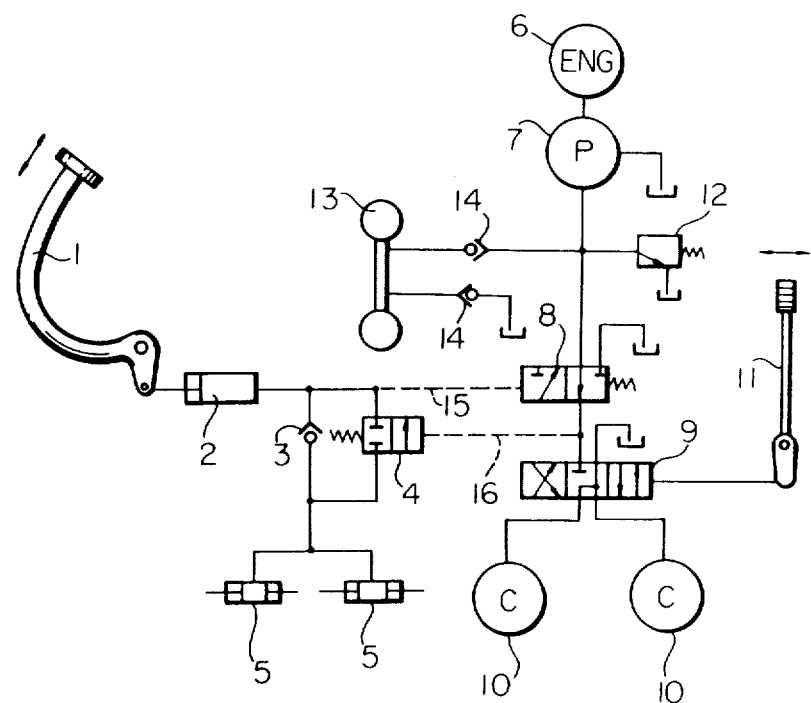
FIG. 1 is a diagrammatic view of an embodiment of fluid control line for the industrial truck according to the present invention.

In an embodiment of the fluid power control system according to the present invention, shown in FIG. 1, a fluid control hydraulic line comprises a master cylinder 2 operated by a brake pedal 1 and a check valve 3 in a hydraulic line between the master cylinder 2 and a pair of wheel cylinders 5 so that an inverse current of brake oil from the wheel cylinder 5 to the master cylinder 2 is prevented and a control valve 4 permits a bypass current of the brake oil. In another hydraulic line, compressed oil is fed from a pump 7 which is driven by an engine 6 to a torque convertor 13 via a check valve 14 while the compressed oil is fed to a pair of oil clutches 10 via a cut-off valve 8 and a change valve 9 so that turbine oil, for operating the torque convertor 13 and the hydraulic clutches 10, is controlled. When the pressure of the compressed oil fed from the pump 7 becomes a level higher than a predetermined value, the compressed oil is discharged through a waste valve 12. The hydraulic clutches 10 are operated by a manual operating lever 11 connected to the change valve 9.

For example, FIG. 1 shows that the lever 11 is positioned at its neutral position and the clutches 10 are connected to a tank so that the oil pressure is maintained at zero level, in other words, the clutches 10 are maintained at released condition. However, when the lever 11 is turned to right (in FIG. 1), the change valve 9 is changed to a connection of a right side position and the left side clutch 10 is connected to the pump 7 so that the left side clutch 10 is engaged. On the other hand, the right side clutch 10 is connected to the tank so that this clutch 10 is released. For example, in the case that the left side clutch 10 is connected to a reduction gear for forward movement of the truck while the right side clutch 10 is connected to a reduction gear for backward movement thereof, the truck is moved forward by a turning motion of the lever 11 to a right side in FIG. 1. On the other hand, the change valve 9 is changed in its connection to a left side one by a turning motion of the lever 11 to a left side so that the truck is moved backward. Changing motion of the cut-off valve 8 is controlled by hydraulic pressure created by the master cylinder 2 and the hydraulic pressure is transmitted to the cut-off valve 8 via a conduit 15. Position of the control valve 4 is controlled by hydraulic pressure transmitted from the clutches 10 and this hydraulic pressure is led to the control valve 4 via a conduit 16.

Figure 2:
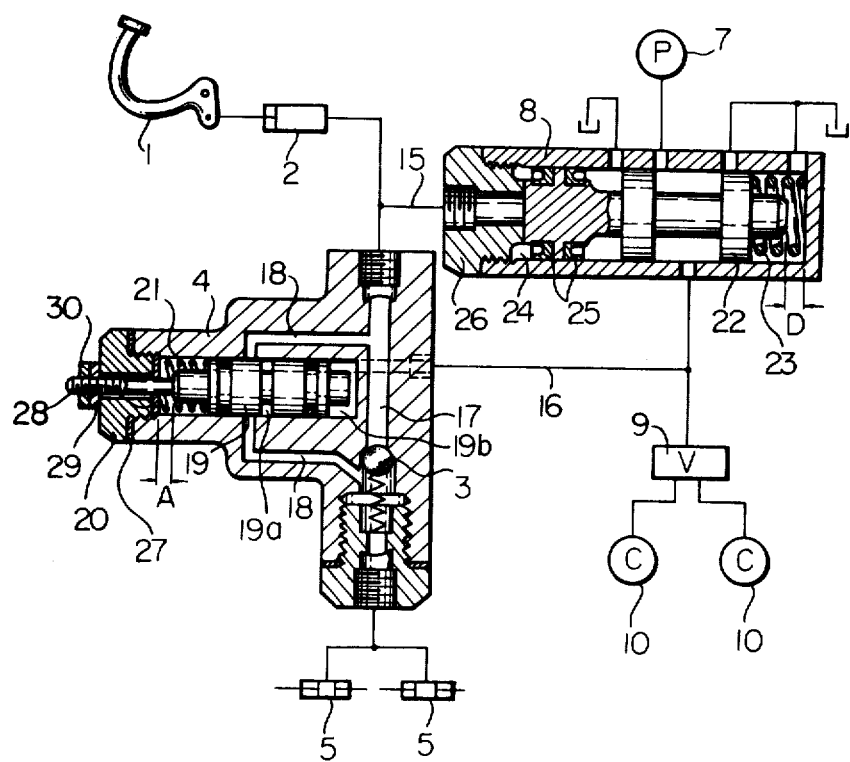
FIG. 2 is a sectional view of the device in connection with the fluid control line shown in FIG. 1.

MOre detailed constructions of the control valve 4 and the cut-off valve 8 are shown in FIG. 2. The check valve 3 is arranged in a hydraulic line 17 between the master cylinder 2 and the wheel cylinder 5 so that a return current of brake oil from the wheel cylinder 5 to the master cylinder 2 is prevented and a spool 19 is movably disposed in the control valve so as to control the fluid current in a bypass line 18. The spool 19 is always pushed to the right (in FIG. 2) by a helical spring 21 so that the force of spring 21 is always against a force directed to a left hand direction which is created by the turbine oil under pressure led into a compression chamber 19b through a conduit 16. When the pressure of the turbine oil is elevated to more than a predetermined valve, the spool 19 is displaced to the left while opposing the force of spring 21. An annular groove 19a, formed upon the spool 19, communicates with a passageway 18 so that the interruption of the hydraulic line from the wheel cylinders 5 to the master cylinder 2 is released. An opposing force to the spring 21 is created by a retainer 20 disposed in the control valve 4. An annular spacer 27 is disposed between the retainer 20 and an end of the control valve 4. An annular spacer 28 is disposed between the retainer 20 and the spring 21. The length of stroke (A) of the spool 19 can be adjusted by changing the thickness of the spacer 27, since the spool 19 contacts with the spacer 28 at the termination of the stroke thereof. An end portion of the spool 19 coaxially extends to an outside of the retainer 20 and engages with double nuts 29 and 30 so that relative positions between the annular groove 19a and the passageway, that is, bypass line 18 is adjustable.

Next, the construction of the cut-off valve 8 is hereinafter illustrated. A spool 22 is movably disposed in the cut-off valve 8 so as to control the hydraulic line between the pump P and the hydraulic clutches 10 and is always pushed to the left (in FIG. 2) by the force of spring 23 so that the rightward force created by brake oil under pressure is opposed. The above-mentioned brake oil is led into a chamber 24 by way of a conduit 15. When the hydraulic pressure of the brake oil elevates to more than a predetermined valve, the spool 22 is displaced rightward while opposing the force of spring 23, so that the hydraulic line from the pump P to the clutches 10 is interrupted and the clutches 10 are subjected to communicate with the tank, therefore these clutches 10 are disengaged. After rightward displacement of the spool 22 by its stroke D, the spool 22 contacts the body of cut-off valve 8.

The leftward displacement of the spool 22 is restricted by a retainer 26 mounted on the body of cut-off valve 8. To prevent mixing of the brake oil with the turbine oil, an oil seal 25 is adopted to the spool 22.

When the engine is driven and the manual lever 11 is turned to the right so that the truck is in a condition of forward driving, the left side clutch 10 communicates with the pump 7 under pressure, while oil under the same pressure communicates with the chamber 19b by way of the hydraulic conduit 16, so that the spool 19 is displaced to the left. Consequently, the hydraulic passageway from the wheel cylinders 5 to the master cylinder 2 is opened. In this condition, if the brake pedal 1 is depressed so as to stop the driving of the truck, the brake oil of the master cylinder 2 pushes the check valve 3 so that interruption of the hydraulic line between the master cylinder 2 and the wheel cylinders 5 is released, thereby a braking force is imparted to the truck while the pressure of the brake oil is admitted to the chamber 24 of the cut-off valve 8 through the hydraulic conduit 15 so that the spool 22 is pushed to the right (in FIG. 2), thereby communication between the pump 7 and the clutches 10 is interrupted while the clutches 10 communicate with the tank so that the respective clutches are disengaged. Consequently, when it is required to actuate a cylinder for load handling operation, since the engine can be driven at a high speed while depressing the brake pedal and it is not necessary to return the manual lever 11 to the neutral condition thereof, the stopping operation of the truck and the successive load handling operation can be simply and practically carried out. In this condition, since the hydraulic conduit 16 communicates with the tank, a force pushing the spool 19 to the left becomes nil, so that the spool 19 is returned to a position shown in FIG. 2. Therefore, even if the depression of the brake pedal 1 is released so as to drive the truck forward, since the hydraulic line from the wheel cylinders 5 to the master cylinder 2 is interrupted by the spool 19, it is prevented to release the braking force rapidly. However, the brake oil in the chamber 24 is led to the master cylinder 2 by the resilient force of the spring 23 disposed in the cut-off valve 8 so that the spool 22 is displaced to the left and the interruption of the hydraulic conduit from the pump 7 to the clutches 10 is opened as shown in FIG. 2 and the hydraulic conduit from the clutches 10 to the tank is interrupted. Consequently, oil under pressure is again admitted into the chamber 19b in accordance with the elevation of oil in the clutches 10 and when the above-mentioned oil pressure elevates more than a predetermined pressure created by the spring 21, the spool 19 is displaced to the left so that the wheel cylinders 5 communicate with the master cylinder 2, thereby the braking force working upon the vehicle is released.

Since the braking force imparted to the truck is released after the oil pressure in the clutches 10 elevates and the driving force of the engine is transmitted to driving wheels, it is practically prevented from moving rearward by the dead weight of the vehicle at the start of hill climbing. As already illustrated, the cross-sectional area of the bypass hydraulic line 18 can be properly adjusted by adjusting the thickness of the spacers 27, 28 and the setting position of the double nuts 29 and 30. In the case of carrying fragile substances such as glassware or ceramics, it is desirable that the shock created by the starting of the truck is as small as possible. To attain the above-mentioned purpose, it is preferable to use a thick spacer 28 or thin spacer 27 so that the stroke of the spool 19 is made small. In other words, the annular groove 19a partially coincides with the bypass hydraulic line 18 so that flow resistance is increased. Consequently, the brake oil gradually returns from the wheel cylinders 5 to the master cylinder 2 so that the truck starts its hill climbing gradually even though the depression of the brake pedal is released instantly.

On the other hand, when the engine is stopped while depressing the brake pedal 1 and then the above-mentioned depression is released, since the pump 7 is maintained in its stopped condition, fluid pressure to the chamber 19b is not admitted so that the spool 19 is displaced to the right by the force of spring 21. Consequently, the braking force of the wheel cylinders 5 is maintained so that the above-mentioned force can be effectively utilized as a braking force for parking the vehicle.

In the case of hauling a vehicle while stopping the engine thereof, it is practically possible to release the braking force imparted to the truck by means of fastening the double nuts 29 and 30 so that the bypass line 18 is communicate with the annular groove 19a of the spool 19.

Further, the force of spring 21 may be adjusted so that the spool 19 is commenced to displace to the left (in FIG. 2) when the fluid pressure in the driving system reaches a sufficient value to engage the clutches. However, since it is practically possible to transmit the driving force even though the clutches are not in their complete engaged condition but in their contacting condition so as to slide, the force of the spring 21 may be adjusted so that the fluid pressure in the hydraulic system imparted into the chamber 19b is sufficiently large to create the above-mentioned contacting condition of the clutches when the interruption of the communication between the wheel cylinders 5 and the master cylinder commences to be release.

In the above-mentioned embodiment, the control valve 4 and the cut-off valve 8 are separately applied to lead a pilot fluid pressure by way of the hydraulic conduits 15 and 16. However, it is practically possible to utilize the control valve 4 and the cut-off valve 8 as a single sequence valve of one body. Further, the cut-off valve 8 is controlled in accordance with the fluid pressure in the master cylinder 2, but it may be practically possible that as it is well applied in the conventional industrial trucks, the spool 22 of the cut-off valve 8 is connected to the brake pedal 1 by a suitable link mechanism so that the cut-off valve 8 is operated in accordance with the turning of the brake pedal 1.

In a modified embodiment of the fluid control system shown in FIG. 1, a check valve is arranged in a hydraulic line from a master cylinder for braking action to wheel cylinders so that the check valve interrupts the return flow of the brake oil from the wheel cylinders to the master cylinder, and a control valve is arranged in a hydraulic line which is bypassed to the check valve, and the control valve is communicated with a cut-off valve arranged in a hydraulic line for leading turbine oil to clutches which are operated by hydraulic pressure, so that after the cut-off valve opens the hydraulic line from a pump to the clutches, the control valve opens the hydraulic line which admits the return flow of the brake oil from the wheel cylinders to the master cylinder. Therefore, turbine oil is supplied to the clutches before the braking force of the truck reaches nil, so that the driving force of the engine is transmitted to the wheels so as to start the truck at the same time of releasing the braking force. Consequently, it is practically prevented to move the truck backward at the start of hill climbing. Further, it is possible to throttle the control valve so that the braking force can be gradually released, thereby the rapid starting of the truck can be prevented.

Figure 3:
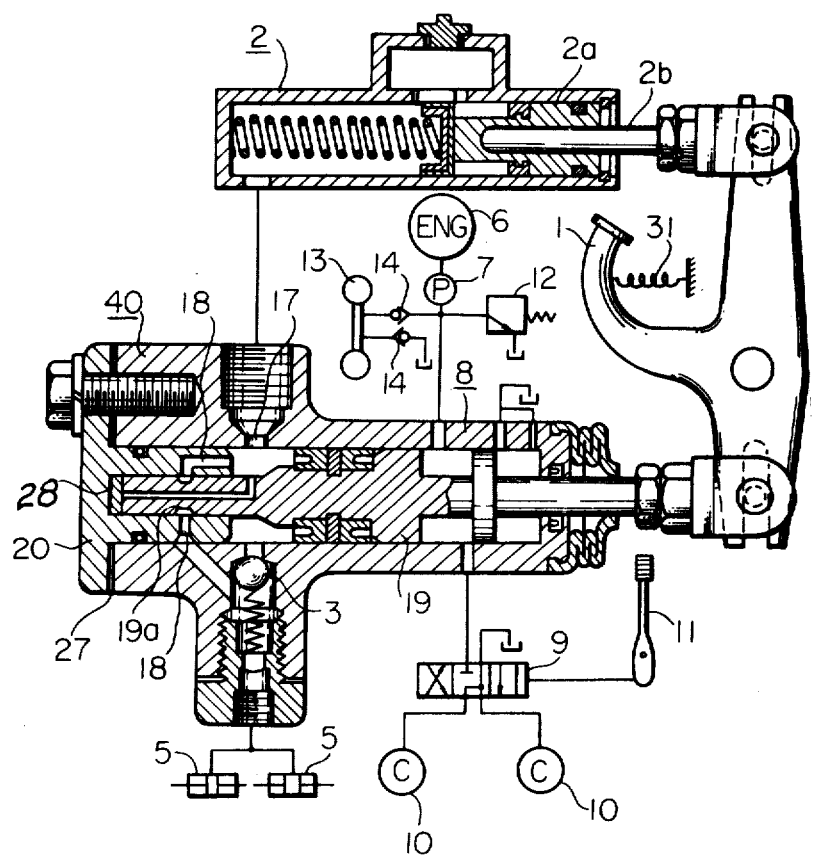
FIG. 3 is a sectional view of a modified embodiment of fluid control device for the industrial truck, according to the present invention.

Referring to FIG. 3, a plunger 2b pushes a piston 2a to the left by depressing the brake pedal 1 downward. Brake oil is discharged from the master cylinder 2 and led to the check valve 3 via the hydraulic line 17 so that the check valve 3 is pushed and the hydraulic line is opened, thereby the wheel cylinders 5 create a braking force which is imparted to the truck. And the spool 19 is moved to right by the depression of the brake pedal 1. Consequently, the communication of the annular groove 19a of the spool 19 with the hydraulic passageway 18 is interrupted so that the return flow of brake oil from the wheel cylinders 5 to the master cylinder 2 is interrupted, while the hydraulic line from the pump 7 to the clutches 10 is closed by the spool 19, thereby turbine oil in the clutches 10 is discharged into the tank so that the clutches 10 are disengaged. Therefore, in the case when the lever 11 is turned to the right and the truck is in the forward driving condition and since the braking force is applied to the truck by depressing the brake pedal 1 and then the clutches 10 are disengaged, it is possible to carry out the load handling operation while driving the engine at a high speed without returning the manual lever 11 to its neutral position.

Next, when the depression of the brake pedal 1 is released, the brake pedal 1 is turned to its original position by the force of spring 31 and the spool 19 is displaced to the left as shown in FIG. 3. In this motion, the plunger 2b is returned to its position, shown in FIG. 3, prior to the piston 2a, the piston 2a is returned to its position shown in FIG. 3 after the spool 19 is displaced to the left so that brake oil from the wheel cylinders 5 is led to the master cylinder 2 via the hydraulic passageway 18 and the annular groove 19a. It is important that, when the spool 19 is displaced to the left, firstly, the hydraulic line between the pump 7 to the clutches 10 is opened and secondly, the hydraulic line from the wheel cylinders 5 to the master cylinder 2 is opened. By the above-mentioned particular design of the system, since it is possible to release the braking force by the following manner when the clutches 10 are firstly engaged by feeding oil under pressure thereinto and the brake oil is secondly discharged from the wheel cylinders 5, it is practically possible to prevent the backward movement of the truck when the truck commences its hill climbing. By changing the thickness of the spacers 27 and 28, timing to open the hydraulic passageway from the wheel cylinders 5 to the master cylinder 2 after opening the passageway from the pump 7 to the clutches 10 can be adjusted. Further, by properly choosing the thickness of the spacers 27 and 28, the effective cross-sectional area of the bypass passageway 18 can be adjusted.

In the case of carrying fragile substance such as glassware or ceramics, it is desirable that the shock created by the starting of the truck is as small as possible and it is preferable to use thick spacers 27, 28. Since the bypass passageway 18 communicates with the annular groove 19a slightly evenly, though the spool 19 is displaced to its utmost left position, the flow resistance of this portion is increased so that the brake oil gradually returns from the wheel cylinders 5 to the master cylinder 2 so that the truck starts gradually even though the depression of the brake pedal is released instantly.

In the above-mentioned embodiment, the control valve 40 and the cut-off valve and the spool 19 for controlling the motions of these valves are arranged as one body. It may be possible to separate these valves in such a way that a spool of the control valve 40 is actuated in accordance with the motion of a spool of the cut-off valve.

Figure 4:
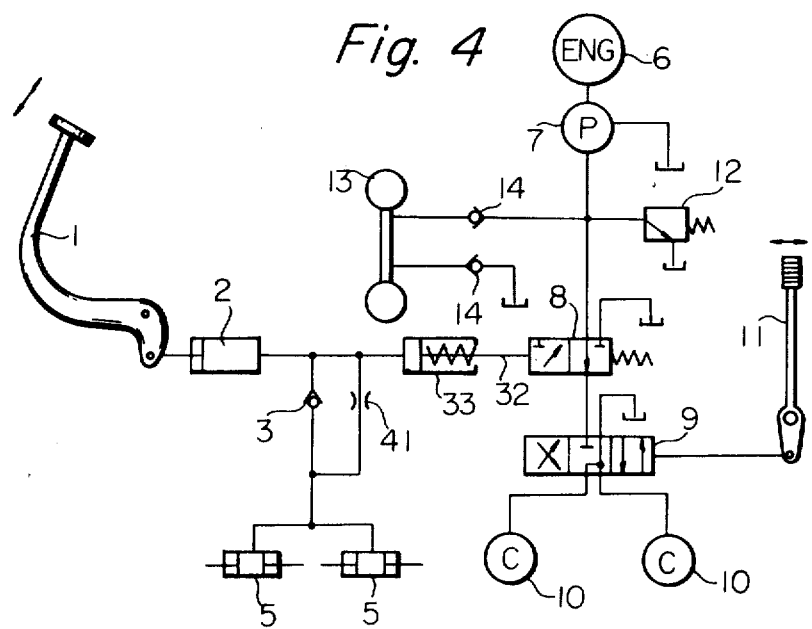
FIG. 4 is a diagrammatic view of a further modified embodiment of fluid control line for the industrial truck, according to the present invention.

Further modified embodiment of the present invention is shown in FIG. 4. In FIG. 4, a check valve 3, which interrupts the return flow of the brake oil from the wheel cylinders 5 to the master cylinder 2, is arranged in the hydraulic line between the master cylinder 2, which is actuated by the brake pedal 1 and the wheel cylinders 5, and an orifice 41 is used in the bypass line. The changing of the cut-off valve 8 is controlled by an actuator 33 which is actuated when the pressure in the control hydraulic line reaches a slightly higher level than a pressure at which a brake drum (not shown) commences to contact a brake shoe (not shown). That is, when the brake pedal 1 is depressed, the oil in the master cylinder 2 is discharged into the wheel cylinders 5 via the check valve 3 and the orifice 41 so that the brake shoe (not shown) is subjected to extend toward the brake drum (not shown). When the brake shoe commences to contact the brake drum, the oil pressure in the control hydraulic line is elevated rapidly, a push rod 32 is displaced to the right while opposing the force of a spring disposed in the actuator 33. Consequently, the cut-off valve 8 is changed in its position to that of the left so that the communication of the pump 7 with the clutches 10 is interrupted and the clutches 10 communicate with the tank. Therefore, the clutches are automatically disengaged in accordance with the depression of the brake pedal so that the operation of the truck at the time of braking can be easily carried out.

When it is required to start the truck forward, the manual lever 11 is turned to the right while depressing the brake pedal 1, so that the change valve 9 is changed in its position to the right side one thereof. Next, the push rod 32 of the actuator 33 is displaced to the left by a spring force in accordance with releasing the depression of the brake pedal 1. Consequently, the cut-off valve 8 is returned to its left side position (in FIG. 4) and oil under pressure is rapidly fed from the pump 7 to the clutches 10 so that the clutches 10 are engaged and the driving force of the engine is transmitted to the driving wheels of the truck so that the truck commences to move forward. If the hydraulic pressure in the hydraulic line for braking action is very low so that the braking force is almost zero, the truck starts instantly.

However, the hydraulic line from the wheel cylinders 5 to the master cylinder 2 is interrupted by a check valve 3 while restricting its flow rate by the orifice 41 arranged in the bypass line, so that the braking force is gradually released. In other words, the truck can be started smoothly. In the case of starting hill climbing, since the braking force is released gradually after transmission of the driving force of the engine to the driving wheels, backward movement of the truck by its own weight can be prevented.

Figure 5:
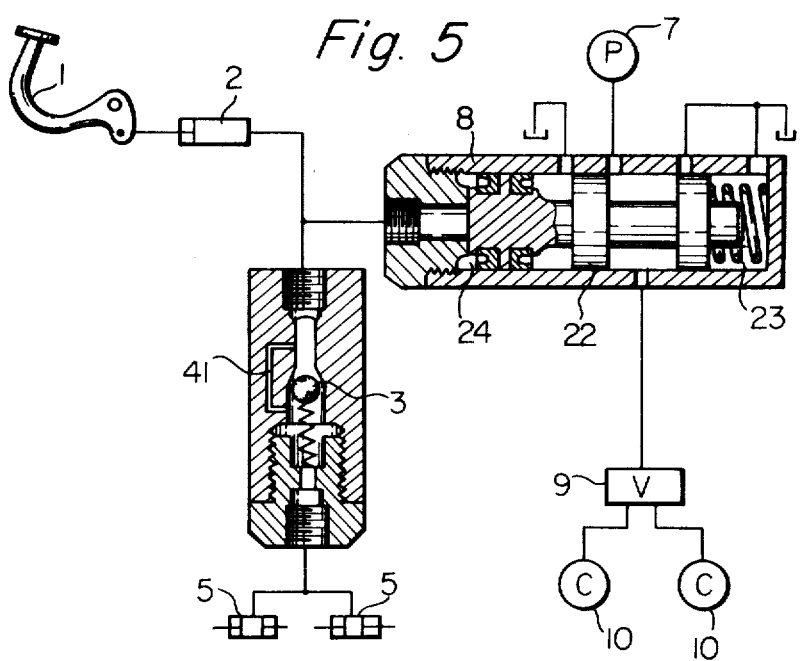
FIG. 5 is a sectional view of a modified embodiment of fluid control device in connection with the fluid control line shown in FIG. 4.

In the embodiment shown in FIG. 5, the cut-off valve 8 and the actuator 33 are arranged in one body and if the spring 23 to return the spool in the cut-off valve 8 is settled so that the spool 22 commences to move right when the force of the spring 23 is larger than the hydraulic pressure at the time of commencing contact of the brake drum with the brake shoe, the similar function as the embodiment shown in FIG. 4 can be attained.

What we claim and desire to secure by Letters Patent is:

1. In an industrial truck having a single brake pedal, a master cylinder operated by said brake pedal, a pair of wheel cylinders for imparting braking force to said truck by fluid supply from said master cylinder, a hydraulic line connecting said master cylinder with said wheel cylinders, a hydraulic pump driven by an engine, fluid actuated clutch means for driving said truck and a fluid supply line connecting said pump with said clutch means, a fluid control system comprising a check valve in said hydraulic line to block return flow of fluid from said wheel cylinders to said master cylinder, a bypass fluid line shunting said check valve to permit return flow of fluid from said wheel cylinders to said master cylinder without passing through said check valve, control valve means for controlling said return flow through said bypass fluid line, a cut-off valve arranged in said fluid supply line between said pump and clutch means, means for operating said cut-off valve including means fluidly connecting said master cylinder and said cut-off valve, and means operably connected with said cut-off valve for operating said control valve means.

2. A fluid control system according to claim 1, wherein said means for operating said control valve means comprises means for transmitting hydraulic pressure for actuating said control valve means to open said bypass fluid line when hydraulic pressure in said fluid supply line to said clutch means exceeds a predetermined value.

3. A fluid control system according to claim 1, wherein said cut-off valve is operably connected with said means for operating said control valve means so that said bypass fluid line is opened by actuating said control valve means after said cut-off valve provides communication from said pump to said clutches clutch means.

4. A fluid control system according to claim 1, wherein said clutch means comprises a pair of clutches and wherein a manually operable valve is provided in said fluid supply line to direct fluid selectively to one or the other of said clutches.

5. A fluid control system according to claim 1, comprising a flow-controlling orifice in said bypass fluid line.

6. A fluid control system according to claim 1, wherein said cut-off valve means comprises a housing having a port connected with said clutch means, a port connected with said pump and a port connected with a fluid discharge, a valve member movable in said housing between a first position in which said port connected with said pump is in communication with said port connected with said clutch means and a second position in which said port connected with said clutch means is in communication with said port connected with said discharge, spring means normally biasing said valve member to said first position, cooperating piston and cylinder means for moving said valve means to said second position against the bias of said spring means, said means for operating said cut-off valve including means fluidly connecting said master cylinder and said cut-off valve comprising a fluid line connecting said master cylinder with said piston and cylinder means for moving said valve member to said second position when said master cylinder is operated by said brake pedal.

7. A fluid control system according to claim 6, wherein said control valve means comprises a valve housing having a port connected with said master cylinder, and a port connected with said wheel cylinders, a control valve member movable in said housing between a first position in which said ports are not in communication with one another and a second position in which said ports are in communication with one another, spring means for biasing said control valve member normally to said first position, piston and cylinder means for moving said control valve member to said second position against the bias of said spring means, said means operably connected with said cut-off valve for operating said control valve means comprising a fluid line connecting said piston and cylinder means of said control valve means with said port of said cut-off valve connected with said clutch means to move said control valve member to said second position when predetermined fluid pressure is supplied by said cut-off valve to said clutch means.

8. A fluid control system according to claim 7, wherein said bypass fluid line includes fixed metering means for attenuating flow of fluid through said bypass fluid line.

9. A fluid control system according to claim 7, further comprising a torque converter connected with said pump for driving said truck under control of said clutch means.

* * * * *